United States Patent [19]
Nanataki et al.

[11] Patent Number: 5,893,954
[45] Date of Patent: Apr. 13, 1999

[54] METHOD FOR PRODUCING A CERAMIC MEMBER HAVING FINE THROUGHHOLES

[75] Inventors: Tsutomu Nanataki, Toyoake; Hisanori Yamamoto, Nagoya, both of Japan

[73] Assignee: NGK Insulators, Ltd., Japan

[*] Notice: This patent is subject to a terminal disclaimer.

[21] Appl. No.: 08/774,172

[22] Filed: Dec. 26, 1996

[30] Foreign Application Priority Data

Jan. 9, 1996 [JP] Japan .................... 8-001153

[51] Int. Cl.$^6$ .................... B32B 31/26; C04B 35/486
[52] U.S. Cl. .................... 156/89.11; 156/252; 156/253; 347/123
[58] Field of Search .................... 156/89, 252, 253, 156/89.11; 347/123, 127

[56] References Cited

U.S. PATENT DOCUMENTS

| | | |
|---|---|---|
| 4,799,070 | 1/1989 | Nishikawa . |
| 5,517,076 | 5/1996 | Takeuchi et al. .................... 310/358 |
| 5,728,244 | 3/1998 | Nanataki et al. . |

FOREIGN PATENT DOCUMENTS

| | | |
|---|---|---|
| 636 593 | 7/1994 | European Pat. Off. . |
| 649 008 | 10/1994 | European Pat. Off. . |
| 744 388 | 5/1996 | European Pat. Off. . |
| 744 389 | 5/1996 | European Pat. Off. . |

*Primary Examiner*—Curtis Mayes
*Attorney, Agent, or Firm*—Wall Marjama Bilinski & Burr

[57] ABSTRACT

A method for producing a ceramic member having fine throughholes, includes the steps of: producing a first green sheet for a thin ceramic plate; forming a plurality of fine throughholes having a minimum diameter of 150 μm or less after firing in the first green sheet and having a minimum distance of 150 μm or less between two of the throughholes after firing, the throughholes being disposed zigzag; producing a second green sheet to be used for a ceramic substrate; forming at least one window portion in the second green sheet; laminating the first green sheet on the second green sheet for obtaining a unitary laminate so that the plurality of fine throughholes in the first green sheet match the window portion(s) of the second green sheet; and firing the laminate so as to obtain a unitary sintered body; wherein a shorter side (maximum width) W of the window portion of the ceramic substrate satisfies the formula: W(mm)≧0.01/d, wherein d is the minimum distance between two of the throughholes after firing. Alternatively, the throughholes can be formed in the first green sheet after it is laminated with the second green sheet.

15 Claims, 6 Drawing Sheets

METHOD FOR PRODUCING A CERAMIC MEMBER HAVING FINE THROUGHHOLES

BACKGROUND OF THE INVENTION AND RELATED ART STATEMENT

The present invention relates to a method for producing a ceramic member having a plurality of fine throughholes.

There have conventionally been used a metal, a synthetic resin, or the like, for a member having fine throughholes such as an encoder, a precision high fine electric field shutter, an ion flow control head, and a scale.

In such products, fine throughholes of a ceramic member are used for detecting or recording a site by passing or not passing a gas, a liquid, fine solid particles, light, etc., therethrough.

Such a member having fine throughholes has recently been required to have high density, high precision, and high reliability.

However, since metals and synthetic resins which have been conventionally used cannot satisfy these requirements, it has been expected that a member made of a different material from the conventional ones would be developed.

In view of these problems, the present invention aims to provide a member having fine throughholes made of a material having heat resistance, abrasion resistance, and low thermal expansion and to improve density, precision, and reliability of machinery and tools such as an encoder, a precision high fine electric field shutter, an ion flow control head, and a scale.

SUMMARY OF THE INVENTION

According to the present invention, there is provided a method for producing a ceramic member having fine throughholes, comprising the steps of:

producing a first green sheet for a thin ceramic plate;

forming a plurality of fine throughholes having a minimum diameter of 150 µm or less after firing in the first green sheet and having a minimum distance of 150 µm or less between two of the throughholes after firing, the throughholes being disposed zigzag;

producing a second green sheet to be used for a ceramic substrate;

forming at least one window portion in the second green sheet;

laminating the first green sheet on the second green sheet for obtaining a unitary laminate so that the plurality of fine throughholes in the first green sheet match the window portion(s) of the second green sheet; and firing the laminate so as to obtain a unitary sintered body;

wherein a shorter side (maximum width) W of the window portion of the ceramic substrate satisfies the formula: W(mm)≧0.01/minimum distance between two of the throughholes (after firing) (mm).

According to the present invention, there is further provided a method for producing a ceramic member having fine throughholes, comprising the steps of:

producing a first green sheet for a thin ceramic plate, producing a second green sheet to be used for a ceramic substrate;

forming at least one window portion in the second green sheet, laminating the first green sheet on the second green sheet for obtaining a unitary laminate so that the first green sheet may cover the window portion(s) of the second green sheet;

forming a plurality of fine throughholes having a minimum diameter of 150 µm or less after firing in a portion corresponding to the window portion in the first green sheet and having a minimum distance of 150 µm or less between two of the throughholes after firing, the throughholes being disposed zigzag; and firing the laminate so as to obtain a unitary sintered body;

wherein a shorter side (maximum width) W of the window portion of the ceramic substrate satisfies the formula: W(mm)≧0.01/minimum distance between two of the throughholes (after firing) (mm).

A main component of the thin ceramic plate is preferably a partially stabilized zirconia.

The thin plate containing a partially stabilized zirconia as a main component (i.e. a component accounting for 50 vol % or more) preferably has a crystalline particle diameter of 2 µm or less.

The thin plate containing a partially stabilized zirconia as a main component preferably comprises a substance partially stabilized by 2–6 mol % of yttrium oxide.

The minimum diameter of the fine throughholes is preferably 100 µm or less after firing.

The minimum distance between two of the throughholes is preferably 100 µm or less after firing.

The thin ceramic plate has a thickness of generally 100 µm or less, preferably 50 µm or less.

The ceramic substrate has a thickness of 50 µm or more, preferably 100 µm or more.

Here, a diameter of a fine throughhole means a diameter when the fine throughhole has a circular cross section, a length of a longer side when it has a rectangular cross section, a longer diameter when it has an oval cross section, and a length of the longest diagonal line when it has a polygonal cross section. A fine throughhole may have any one of the aforementioned configuration or any combination thereof. Incidentally, a diameter of a fine throughhole is an average of diameters measured on the front surface and on the back surface of the thin ceramic plate. A distance d denotes the thinnest thickness of a wall between adjacent fine throughholes as shown in FIG. 6.

BRIEF DESCRIPTION OF THE DRAWINGS

FIG. 7A shows a zigzag disposition. FIG. 7B shows a straight disposition.

DETAILED DESCRIPTION OF THE PREFERRED EMBODIMENT

The present invention is hereinbelow described in detail.

In the present invention, a ceramic member having fine throughholes is produced by firing a laminate of a second green sheet for a ceramic substrate and a thin first green sheet having fine throughholes to form a unitary sintered body.

Forming a fine throughhole requires that the first green sheet has a thin thickness in some degree because of reducing a variance of diameters of throughholes, improving productivity, ease of forming throughholes, etc. Accordingly, the second green sheet is layered on the first green sheet so as to increase rigidity of a ceramic member for practical use.

However, when a laminate having a plurality of fine throughholes is fired so as to be unitarily formed, a stress caused upon firing causes cracks between or around fine throughholes. In order to solve the problem, it is necessary for the maximum width w in the direction parallel to the shorter side of the window portion and a minimum distance d between fine throughholes to satisfy the following formula:

$$w(\text{mm}) \geq 0.01/d(\text{after firing}) \text{ (mm)}$$

Preferably, w and d satisfy: $w(\text{mm}) \geq 0.025/d$ (mm), and more preferably, $w(\text{mm}) \geq 0.05/d$ (mm).

It is not preferable that the maximum width w in the direction parallel to the shorter side of the window portion is 10 mm or more because it causes problems of decreasing handling convenience of a green laminate, strength of the thin ceramic plate after firing, flatness of the thin ceramic plate after firing, etc.

The second green sheet, which works as a ceramic substrate after firing, improves not only rigidity of a member, but also dimensional stability after firing. This is because the thin ceramic plate is liable to have a strain caused by firing shrinkage since the plate has a plurality of fine throughholes when the thin ceramic plate is fired alone.

Figure 7A:
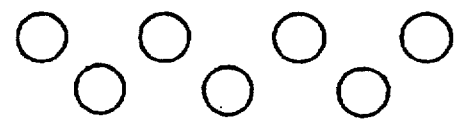
FIGS. 7A and 7B show dispositions of fine throughholes.

In the present invention, a plurality of fine throughholes are arranged zigzag in the first green sheet as shown in FIG. 7A. The plurality of fine throughholes are formed so that the minimum diameter is 150 μm or less after firing and a minimum distance between throughholes is 150 μm or less after firing.

Advantages and effects of the zigzag disposition of the plurality of fine throughholes are hereinbelow described.

Figure 7B:

1. Compared with the straight disposition of fine throughholes as shown in FIG. 7B, a distance between throughholes can be made larger in the zigzag disposition shown in FIG. 7A in view of density of throughholes in the direction shown with arrows in FIGS. 7A and 7B. Accordingly, the zigzag disposition makes production of a punching die easier and makes production of a mask used for laser machining (e.g. excimer laser) easier.

2. Stress generated upon firing is dispersed in the zigzag disposition in various directions, thereby preventing the thin plate having throughholes from getting cracks. That is a crack caused by stress develops in one direction in the straight disposition, while stress is dispersed in various directions and hardly causes a crack in the zigzag disposition. Even if a crack is caused in the zigzag disposition, it hardly develops. Accordingly, even if the zigzag disposition has the same distance between throughholes as in the straight disposition, the zigzag disposition has the aforementioned effects.

3. The zigzag disposition of the present invention enables high densification which is impossible in a straight disposition. That is, fine throughholes cannot be disposed with a pitch the same as or less than a diameter of the throughholes in the straight disposition, while a density of fine throughholes in a direction shown by arrows in the FIGS. 7A and 7B in the zigzag disposition can be made twice as high as that in the straight disposition.

Figure 5A:
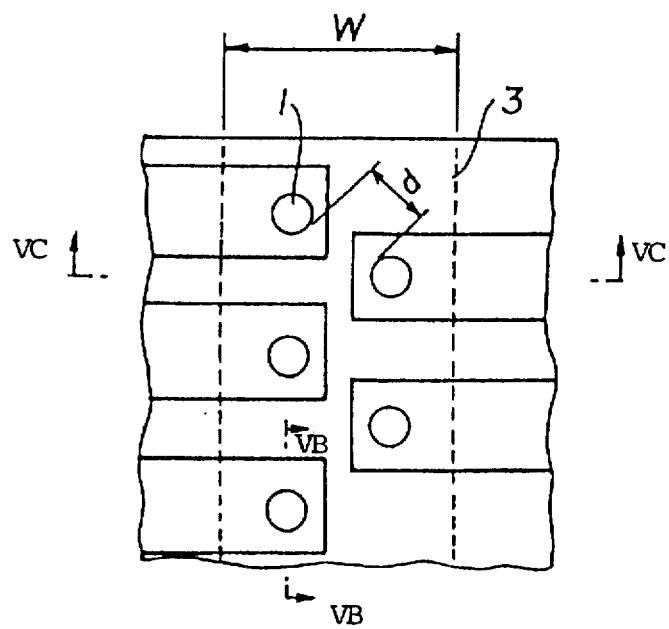
FIG. 5A is an embodiment showing a constitution of an electrode for an electric field shutter.

4. As shown in FIG. 5A an electrode pattern can be made wider in the zigzag disposition in comparison with the straight disposition.

5. When the two dispositions have the same density of throughholes, a member with the zigzag disposition has higher strength than a member with the straight disposition. Accordingly, the member with the zigzag disposition is more excellent in enlargement of the range of its use and ease of handling.

A member having fine throughholes of the present invention is formed so that the minimum value of diameters of fine throughholes after firing is 150 μm or less and the minimum value of distances between fine throughholes after firing is 150 μm or less. These impart more excellent high density and high precision to a product in cooperation with the advantages and the effects of the zigzag disposition. Additionally, since the material is ceramic, reliability can be ensured. Incidentally, a material of the ceramic is preferably a partially stabilized zirconia in order to form fine throughholes each having a diameter of 150 μm or less.

In the present invention, a thin ceramic member is preferably made of a partially stabilized zirconia. Since a partially stabilized zirconia has small thermal expansion coefficient in comparison with a metal, precision of positions of throughholes under a high temperature can be improved. Additionally, since a partially stabilized zirconia has high strength among ceramics, it has good handling ease, durability, and reliability. Further, since it is excellent in corrosion resistance, abrasion resistance, and heat resistance, ranges of temperature and medium application can be made wider.

Crystalline grains of the thin plate containing a partially stabilized zirconia as a main component have an average diameter of 2 μm or less, preferably 1 μm or less for improving strength, abrasion resistance, and corrosion resistance of the thin plate.

A partial stabilizer for zirconia contains yttrium oxide of 2–6 mol %, preferably 2.5–4.0 mol % for improving strength and abrasion resistance of the thin plate containing a partially stabilized zirconia as a main component.

The thin ceramic plate has a thickness of usually 100 μm or less, preferably 50 μm or less, more preferably 30 μm or less. To form the plate thinner makes forming of fine throughholes easier. That is, breakage of pin upon punching by a die/NC can be avoided, precision of punching is improved, i.e., variance of diameters of throughholes on the front and back surfaces can be reduced, occurrence of burrs on a surface for punching can be avoided, and in the case of laser machining, the number of steps except for the breakage of pin and the time for the machining can be reduced. Additionally, when a powder or a liquid passes through the throughholes, resistance upon passing can be reduced. On the other hand, a thin ceramic plate having a thickness of 100 μm or more is not preferable because formability of fine throughholes is decreased.

Incidentally, in order for the thin ceramic plate to have a thickness of 100 μm or less, it is preferable to use a partially stabilized zirconia as a main component in view of strength, tenacity, and abrasion resistance.

A ceramic substrate is used for enhancing rigidity of a ceramic member as a whole. The ceramic substrate preferably has a thickness of 50 μm or more, more preferably 100 μm or more. When the ceramic substrate is thinner than 50 μm, the ceramic member cannot have sufficient rigidity.

The ceramic substrate may have a function besides being used for enhancing rigidity. The ceramic substrate may have a structure consisting of a single layer or a plurality of layers. When the ceramic substrate has a structure of a plurality of layers, the aforementioned preferable thickness corresponds with a total thickness of the layers. It is not necessary for the layers to have the same configuration. Each of the layers may have an independent function. Incidentally, a ceramic substrate 10 in FIGS. 2B and 2C does not have a window portion.

Additionally, the thin ceramic plate preferably has a thinner thickness than the ceramic substrate. When the thin ceramic plate is thicker than the ceramic substrate, dimensional stability of the ceramic member deteriorates after firing.

Each of FIGS. 1A–3C shows an embodiment of a ceramic member having fine throughholes arranged in zigzag, the ceramic member being obtained by the method of the present invention.

Figure 1A:
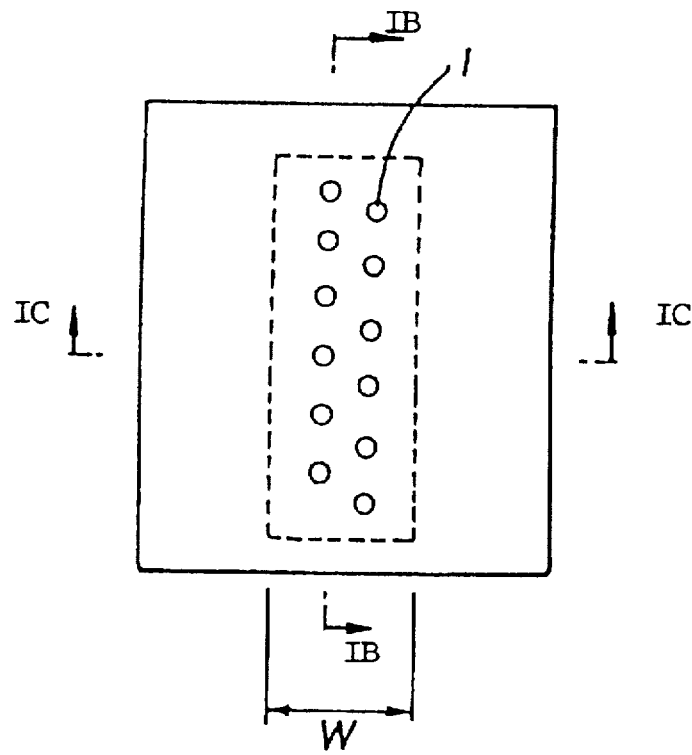
FIG. 1A is an embodiment of a ceramic member having fine throughholes of the present invention.
Figure 1B:
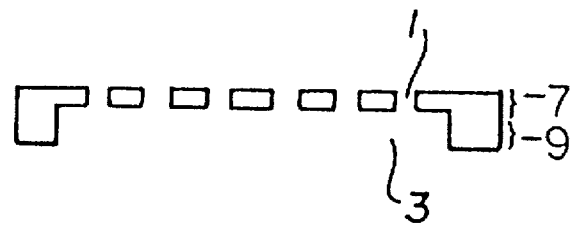
FIG. 1B is a cross sectional view of FIG. 1A at 1B—1B.
Figure 1C:
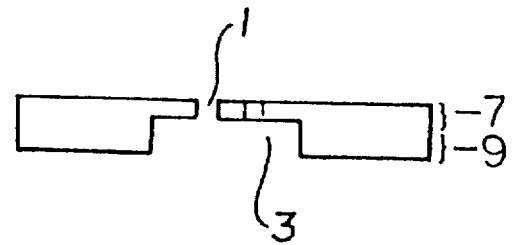
FIG. 1C is a cross sectional view of FIG. 1A at 1C—1C.
Figure 2A:
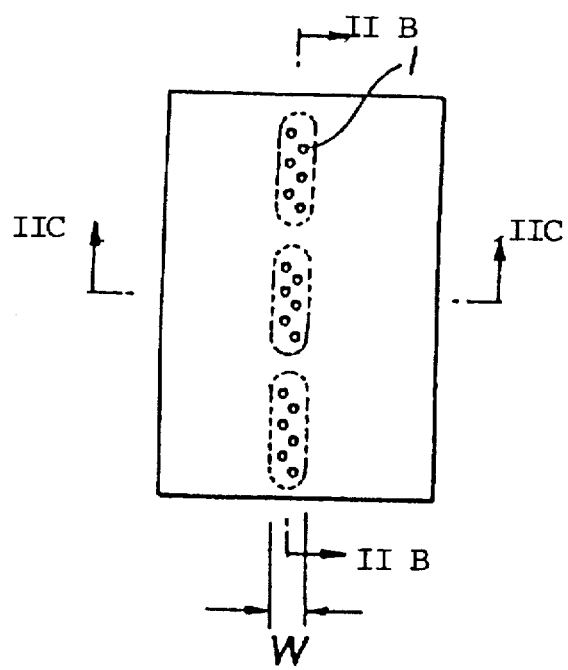
FIG. 2A is another embodiment of a ceramic member having fine throughholes of the present invention.
Figure 2B:
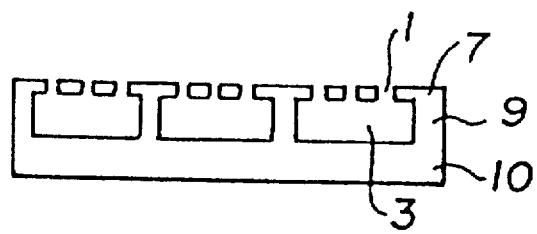
FIG. 2B is a cross sectional view of FIG. 2A at IIB—IIB.
Figure 2C:
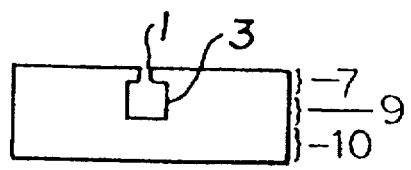
FIG. 2C is a cross sectional view of FIG. 2A at IIC—IIC.
Figure 3A:
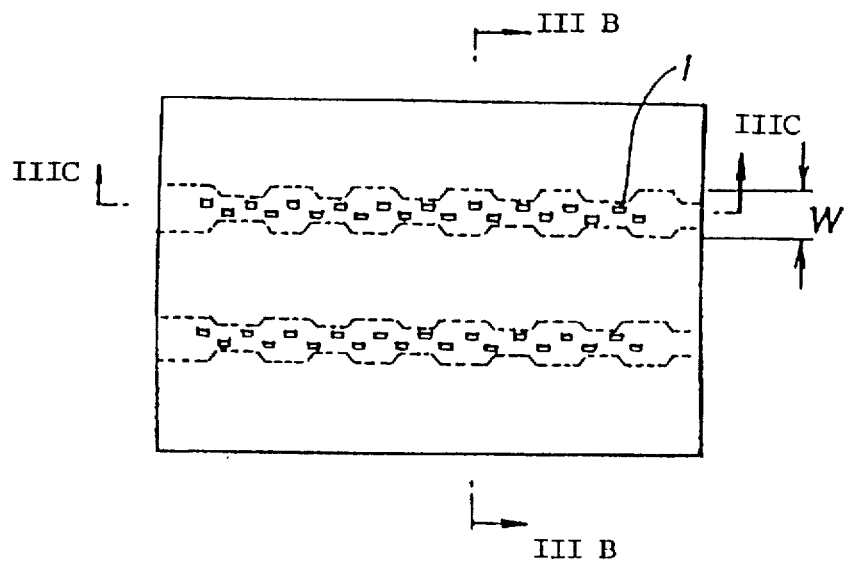
FIG. 3A is a still another embodiment of a ceramic member having fine throughholes of the present invention.
Figure 3B:
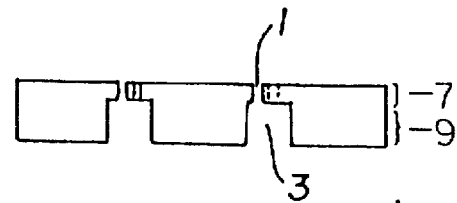
FIG. 3B is a cross sectional view of FIG. 3A at IIIB—IIIB.
Figure 3C:
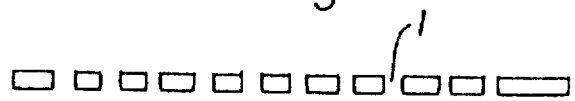
FIG. 3C is a cross sectional view of FIG. 3A at IIIC—IIIC.

FIGS. 1A, 1B, and 1C show a ceramic member which is a unitarily laminated sintered body consisting of a thin ceramic plate 7 having fine throughholes 1 arranged zigzag and a ceramic substrate 9 having a window portion 3. FIGS. 2A, 2B, and 2C show a ceramic member in which a ceramic substrate 10 without any window portion is laminated on a ceramic substrate 9. FIGS. 3A, 3B, and 3C show a unitarily laminated ceramic member consisting of a ceramic substrate 9 having three layers each of which has a window portion 3 having a respective shape and a thin ceramic plate 7 having fine throughholes 1 arranged zigzag.

In the first and second inventions, the first green sheet for a thin ceramic plate and the second green sheet for a ceramic substrate are produced in the manner described below.

A slurry or a paste for producing each of the aforementioned green sheets is prepared in the same manner as a conventional one by blending a suitable binder, a plasticizer, a dispersant, a sintering aid, an organic solvent, and the like, with a ceramic powder and mixing by a ball mill, a tri-roll mill, or the like. A ceramic green sheet having a predetermined thickness is formed from the slurry or the paste according to a known means such as doctor blading, calendaring, printing, and reverse roll coater. Then, as necessary, the ceramic green sheet is subjected to cutting, trimming, punching, forming fine throughholes, and green sheets are laminated and subjected to thermal pressing or the like so as to obtain a unitarily molded body having a predetermined configuration and thickness. Incidentally, fine throughholes are formed by die/NC punching, excimer laser machining, or the like. Fine throughholes may be formed in a single green sheet or after green sheets are laminated.

When a thin ceramic plate contains a partially stabilized zirconia as a main component, 30 wt % or less of an aid, for example, alumina, silica, transition metal oxide, clay, mullite, cordierite, spinel, titania, and any combination thereof may be added.

A molded body is subjected to firing so as to obtain a unitary sintered body of the laminate. A firing temperature is generally about 1200–1700° C., preferably about 1300–1600° C. Incidentally, when the laminate after firing has a warp, it is advantageous that a flat and smooth ceramic weight is put on the laminate, and that the laminate is subjected to firing again at a temperature around the firing temperature so as to flatten the laminate.

A particle diameter of a powder for a green sheet for a thin ceramic plate desirably satisfies the following two conditions in order to achieve a diameter and a distance of fine throughholes of the present invention. In forming fine throughholes in a green sheet by mechanical punching or excimer laser machining, each particle cannot be cut unlike a machining of a fired substrate. Accordingly, when a particle diameter of a powder is large, problems arise that a precise machined surface cannot be obtained, a smoothness on the machined surface is decreased, and a burr is generated.

Additionally, to make the particle diameter small can effectively make an extension of a green sheet small during handling a green sheet upon machining of fine throughholes.
Condition 1 of a powder particle diameter A thin ceramic green sheet is subjected to heat treating at 500° C. for 2 hours so as to remove an organic component such as a binder, a plasticizer, a dispersant, and the like. A sample is thus produced. The sample is measured for BET specific surface area so as to obtain a spherical diameter $D_{BET}$ of a particle diameter. When $D_{BET}$ is within the following range, workability and handling easiness of the ceramic plate upon forming fine throughholes are improved.

$$0.02 \geq D_{BET} \geq 0.2 [\mu m]$$

Note: $D_{DET} = 6/\rho S$ [μm]

ρ: Theoretical density of a powder [g/cm$^3$]

S: BET specific surface area [m$^2$/g]

When $D_{BET}$ is 0.02 μm or less, it is difficult to obtain a uniform green sheet.
Condition 2 of a powder particle diameter A slurry before molding a green sheet is diluted by a solvent used for preparing the slurry, and then the slurry is measured for an average particle diameter by a laser-diffraction type of particle measuring apparatus LA-700 produced by Horiba Co. The average particle diameter is 0.8 μm or less, preferably 0.6 μm or less. When the average particle diameter is smaller, flatness of a surface for punching, and smoothness and flatness of a surface for excimer laser machining are improved.

Preferably, populations of a ceramic powder and organic components in a green sheet for a thin ceramic plate satisfy the following formulae, thereby improving machining precision and smoothness of a machined surface and reducing attachments and expansion of the green sheet.

Here, organic components are a binder, a plasticizer, a dispersant, and the like.

$$0.80 \geq A+B \geq 0.98$$

$$0.40 \geq A \geq 0.55$$

$A = GD \times |a/(a+b)| \times 1/\rho_{ce}$ $B = GD \times \Sigma\{|b_i/(a+b)| \times 1/\rho_i\}$ A: Population of a ceramic powder B: Population of organic components a: Parts by weight of a ceramic powder b: Parts by weight of organic components (b=Σb$_i$)

b$_i$: Parts by weight of each organic component

GD: Raw density of a green sheet [g/cm$^3$]

$\rho_{ce}$: Theoretical density of a ceramic powder [g/cm$^3$]
$\rho i$: Theoretical density of each organic component [g/cm$^3$]

A material having a partially stabilized zirconia as a main component is preferably used for a thin ceramic plate having fine throughholes. The partially stabilized zirconia has phase mainly containing tetragonal crystals or a mixed crystals containing at least two kinds of phases selected from a cubic crystal, a tetragonal crystal, and a monoclinic system. This is because such a material is excellent in strength and tenacity.

An adhesion supporting layer may be advantageously employed between green sheets so as to reduce a laminate pressure. A laminate pressure is preferably 100 Kg/cm$^2$ or less, more preferably 40 Kg/cm$^2$ or less. When the laminate pressure is too high, a crack is prone to form because a distance between fine throughholes is narrow.

A material for an adhesion supporting layer may be a slurry for producing a green sheet, a paste, a binder, a plasticizer, a solvent, a mixture thereof, or the like.

An adhesion supporting layer is preferably formed by means of application, printing, spray, or the like.

Desirably, curves caused by firing shrinkage of green sheets for a thin ceramic plate and for a ceramic substrate satisfy the following conditions.

−50° C. ≦ T (thin plate)−T (substrate)≦+50° C.

More preferably,

−20° C. ≦ T (thin plate)−T (substrate)≦+20° C.

Further, curves of a thin ceramic plate and a ceramic substrate desirably coincide with each other at the beginning of firing shrinkage.

Here, T (thin plate) and T (substrate) denote temperatures (°C) of green sheets for a thin ceramic plate and a ceramic substrate, respectively, when their shrinkage rates S reach 50% in the direction of the surfaces by being independently fired at the same temperature as firing the aforementioned laminate.

When the curves do not satisfy the above conditions, a thin ceramic plate is prone to have a crease and/or a dimple by a stress caused upon firing because the ceramic plate is thin. Further, a ceramic portion between fine throughholes is prone to have a crack.

EXAMPLE

The present invention is hereinbelow described on the basis of Examples.

A thin green sheet was produced in the following manner.

100 parts by weight of a partially stabilized zirconia powder ($D_{BET}$=0.1 μm) containing 3 mol % of $Y_2O_3$, 8 parts by weight of a poly(vinyl butyral) resin (binder), 3 parts by weight of DOP (plasticizer), 2 parts by weight of a dispersant of a sorbitan group, 35 parts by weight of xylene (solvent), and 35 parts by weight of 1-butanol (solvent) were mixed in a ball mill for 30 hours so as to obtain a slurry for molding a green sheet having a viscosity of 2000 cps. The slurry is subjected to vacuum deairing so as to adjust a viscosity of the slurry to 4000 cps. A green sheet was formed by a doctor blade apparatus so as to have a thickness of 30 μm after firing.

The slurry subjected to vacuum deairing was diluted by a xylene/1-butanol solvent (weight ratio of 1:1) and measured for an average particle diameter. It was 0.58 μm. Incidentally, as a measuring apparatus there was used a laser diffraction type of particle-size measuring apparatus LA-700 produced by Horiba Co.

A population of a ceramic powder in a green sheet obtained in the above manner was 49%. A total population of organic components and a ceramic powder excluding the solvent was 88%.

Figure 5B:
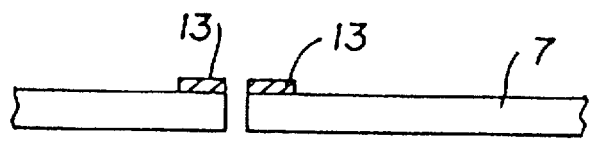
FIG. 5B is a cross sectional view of FIG. 5A at VB—VB.
Figure 5C:
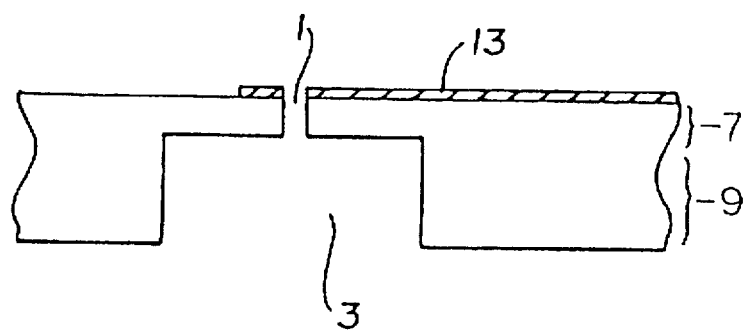
FIG. 5C is a cross sectional view of FIG. 5A at VC—VC.
Figure 6:
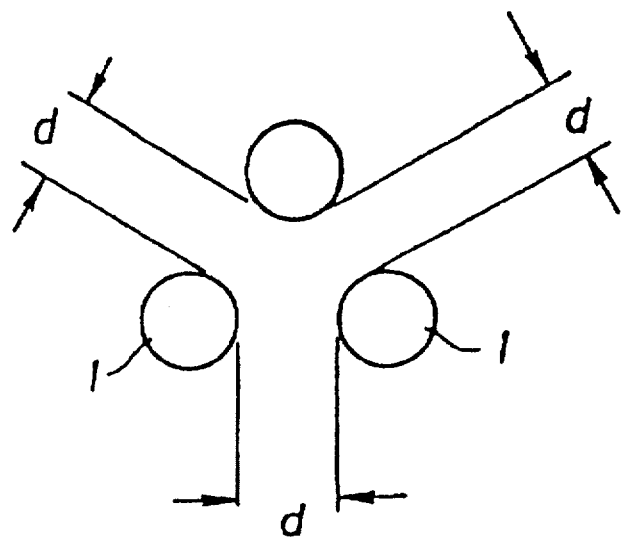
FIG. 6 is an explanatory view showing a distance between fine throughholes.

Subsequently, 2832 fine throughholes 1 (diameter: 60 μm, distance between throughholes: 60 μm, 1416 holes/line ×2 lines) were formed in zigzag as shown in FIGS. 5A, 5B, and 5C. Then, the green sheet was cut so as to have a configuration of 230 mm×20 mm.

As obvious from FIGS. 5A, 5B, and 5C, the zigzag disposition of the fine throughholes provides a wider electrode pattern than a straight disposition.

Then, the aforementioned slurry for molding a thin green sheet was used for forming a green sheet having a thickness of 150 μm after firing by a doctor blade apparatus.

Subsequently, an adhesion supporting layer was formed on the green sheet for a ceramic substrate in the following manner.

100 parts by weight of a partially stabilized zirconia powder ($D_{BET}$=0.1 μm) containing 3 mol % of $Y_2O_3$, 13 parts by weight of poly(vinyl butyral) (binder), 5 parts by weight of DOP (plasticizer), and 50 parts by weight of 2-ethylhexanol (solvent) were kneaded in a tri-roll mill so as to obtain a paste for an adhesion supporting layer having a viscosity of 20000 cps. This paste was printed on the green sheet for a ceramic substrate by a screen printing apparatus so as to obtain an adhesion supporting layer having a thickness of 6 μm after drying.

The thus obtained green sheet having an adhesion supporting layer was cut and punched so as to have a configuration (size of a window: 201 mm×0.95 mm) shown in FIGS. 5A and 5C.

Subsequently, the aforementioned thin green sheet and the green sheet having an adhesion supporting layer are combined with each other and thermally pressed at 80° C. for one minute under 30 Kg/cm$^2$ so as to obtain a unitary laminate.

Then, the unitary laminate was fired at 1500° C. for three hours. The fired laminate was put in between porous alumina plates each having a thickness of 2 mm and fired again at 1500° C. for 5 hours to amend a warp. An average crystalline diameter of a ceramic grain of a thin portion was 0.7 μpm. Incidentally, the above average crystalline diameter D was obtained by observing a surface by an electron microscope and calculating from the following formula $$D(\mu m) = (4S/\pi n)^{1/2}$$

$S(\mu m^2)$ is an observed area, π is the ratio of the circumference of a circle to its diameter, and n is the number of crystalline grain present in an observed area.

As described above, a ceramic member can be produced by firing a unitary laminate of a thin ceramic plate 7 having fine throughholes 1 and a ceramic substrate 9 having a window portion 3. FIGS. 5A, 5B and 5C show an embodiment of an electric field shutter produced by forming a gold electrode 13 on the upper surface of a ceramic member.

Figure 4:
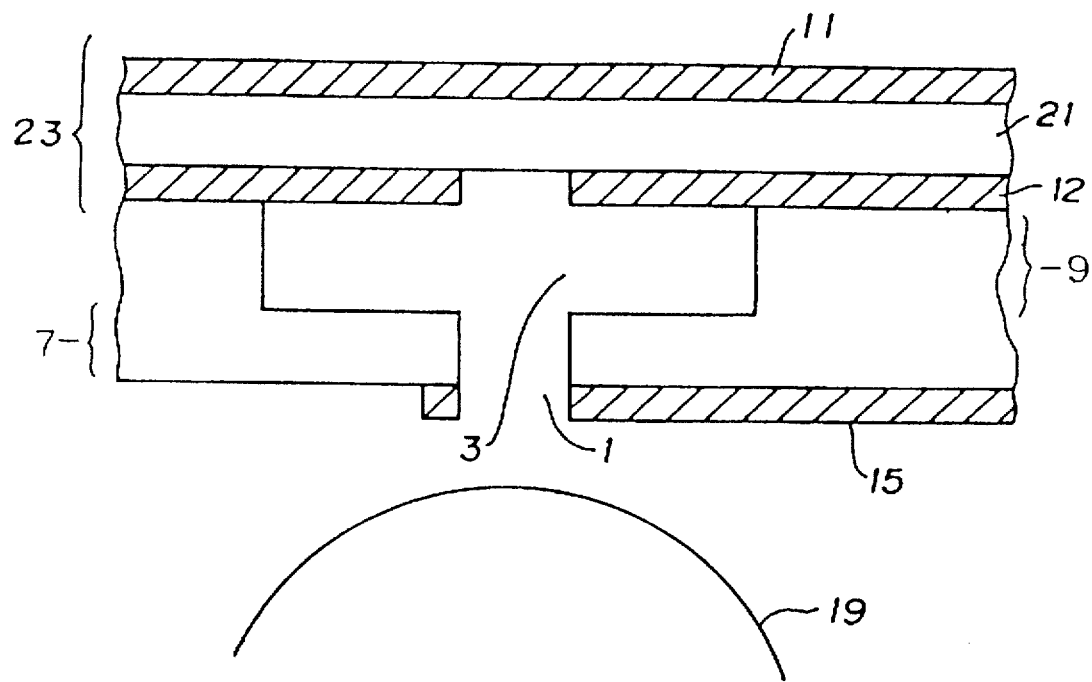
FIG. 4 is an embodiment showing a constitution of an ion flow control head.

As an embodiment in which thus obtained ceramic member having fine throughholes, a ceramic member used as an ion flow control head member is described on the basis of FIG. 4.

A ceramic member is produced by firing a unitary laminate of thin ceramic plate 7 having fine throughholes 1 and a ceramic substrate 9 having a window portion 3. An electrode 15 (gold electrode, thickness: 0.3 μm) for an electric field shutter is formed on the upper surface of the ceramic member. Dielectric thin plate 21 is provided with a line electrode 11 and a finger electrode 12 on the front and back surfaces thereof so as to obtain an ion generator 23. An ion flow control head shown in FIG. 4 is constituted by combining the ceramic member with the ion generator and a dielectric drum 19.

Incidentally, as a matter of course, the present invention is not limited to an ion flow control head and may be another suitable article which requires a member having fine throughholes in its thin portion.

As obvious from the aforementioned description, a ceramic of a thin portion having fine throughholes is made of a material having heat resistance, abrasion resistance, and low thermal expansibility. Accordingly, a range of temperatures at which the member can be used is widen, a range of kinds of media to which the member can be applied is widen, and a member having fine throughholes having a machining precision and high durability can be obtained. Thus, since the present invention can be applied to machinery and tools of a wide range, the present invention is very advantageous. Additionally, forming a plurality of fine throughholes in zigzag achieves avoiding an occurrence of a crack and more excellent high densification.

What is claimed is:

1. A method for producing a ceramic member having fine throughholes, comprising the steps of:

producing a first green sheet for a thin ceramic plate;

forming a plurality of fine throughholes having a minimum diameter of 150 μm or less after firing in the first green sheet and having a minimum distance of 150 μm or less between two of the throughholes after firing, the throughholes being disposed zigzag;

producing a second green sheet to be used for a ceramic substrate;

forming at least one window portion in the second green sheet;

laminating the first green sheet on the second green sheet for obtaining a unitary laminate so that the plurality of fine throughholes in the first green sheet align with the at least one window portion of the second green sheet; and firing the laminate so as to obtain a unitary sintered body;

wherein the maximum width, W, of the window portion of the ceramic substrate satisfies the formula: W(mm) $\geq 0.01/d$(mm), wherein d is the minimum distance between two of the throughholes after firing.

2. A method for producing a ceramic member having fine throughholes according to claim 1, wherein the thin ceramic plate comprises partially stabilized zirconia.

3. A method for producing a ceramic member having fine throughholes according to claim 2, wherein the thin plate has a crystalline grain diameter of 2 μm or less.

4. A method for producing a ceramic member having fine throughholes according to claim 2, wherein the thin plate comprises zirconia partially stabilized by 2–6 mol % of yttrium oxide.

5. A method for producing a ceramic member having fine throughholes according to claim 1, wherein the minimum diameter of the fine throughholes is 100 μm or less.

6. A method for producing a ceramic member having fine throughholes according to claim 1, wherein the thin ceramic plate has a thickness of 50 μm or less.

7. A method for producing a ceramic member having fine throughholes according to claim 1, wherein the ceramic substrate has a thickness of 50 μm or more.

8. A method for producing a ceramic member having fine throughholes according to claim 1, wherein the minimum distance between two of the throughholes is 100 μm or less.

9. A method of producing a ceramic member having fine throughholes, comprising the steps of:

producing a first green sheet for a thin ceramic plate;

producing a second green sheet to be used for a ceramic substrate;

forming at least one window portion in the second green sheet;

laminating the first green sheet on the second green sheet for obtaining a unitary laminate so that the first green sheet covers the at least one window portion of the second green sheet;

forming a plurality of fine throughholes having a minimum diameter of 150 μm or less after firing in a portion corresponding to the at least one window portion in the first green sheet and having a minimum distance of 150 μm or less between two of the throughholes after firing, the throughholes being disposed zigzag; and firing the laminate so as to obtain a unitary sintered body;

wherein a the maximum width, W, of the window portion of the ceramic substrate satisfies the formula: W(mm) $\geq 0.01/d$ (mm), wherein d is the minimum distance between two of the throughholes after firing.

10. A method for producing a ceramic member having fine throughholes according to claim 9, wherein of the thin ceramic plate comprises partially stabilized zirconia.

11. A method for producing a ceramic member having fine throughholes according to claim 10, wherein the thin plate has a crystalline grain diameter of 2 μm or less.

12. A method for producing a ceramic member having fine throughholes according to claim 9, wherein the minimum diameter of the fine throughholes is 100 μm or less.

13. A method for producing a ceramic member having fine throughholes according to claim 9, wherein the thin ceramic plate has a thickness of 50 μm or less.

14. A method for producing a ceramic member having fine throughholes according to claim 9, wherein the ceramic substrate has a thickness of 50 μm or more.

15. A method for producing a ceramic member having fine throughholes according to claim 9, wherein the minimum distance between two of the throughholes is 100 μm or less.

* * * * *